May 10, 1938.   C. G. KOEPPL   2,116,976

APPARATUS FOR REVIVIFYING SPENT DECOLORIZING MATERIALS

Filed May 31, 1934   2 Sheets-Sheet 1

INVENTOR
Carl G. Koeppl

INVENTOR
Carl G. Koeppl

Patented May 10, 1938

2,116,976

UNITED STATES PATENT OFFICE 2,116,976

APPARATUS FOR REVIVIFYING SPENT DECOLORIZING MATERIALS

Carl G. Koeppl, New York, N. Y., assignor of one-half to Anthony William Deller, New York, N. Y.

Application May 31, 1934, Serial No. 728,299

8 Claims. (Cl. 202—104)

The present invention relates to a process of revivifying spent decolorizing and/or purifying material of decomposing material, and/or of heat treating material, and more particularly to an improved method of roasting spent decolorizing and/or purifying material of decomposing material, and/or of heat treating material by indirect heat and to a new and improved apparatus therefor.

It is well known that heretofore decolorizing and purifying materials, such as clay, were used to decolorize and/or purify liquids, such as mineral oils, lubricating oils, gasoline, kerosene and the like. In this process clay or similar material absorbed and/or adsorbed contaminating substances which colored and which rendered the liquid impure. After the clay had been used for a period of time it was saturated with the contaminating substances and did not have any further power to decolorize and/or purify liquids, such as hydrocarbons or other organic liquids. It was then necessary to revivify the spent clay in order to make it useful for further treatments. Generally, the spent clay was fed to a furnace where it was heated by direct contact with hot gases and/or with direct contact with a flame from a burner. Thus, for instance, spent clay was fed to a roasting furnace of the Herreshoff or Wedge type through a feeder nozzle or other feeding device. The clay fell upon the top hearth of the multiple hearth furnace and was then carried from one hearth to a lower hearth by means of teeth or plows which were secured to rabble arms. As is well known these arms were secured to a single vertical shaft which extended through the center of the furnace from the top to the bottom and which was rotated in a suitable manner, such as by means of a set of gears connected to an electric motor. In other words, the clay in its downward travel through the multiple hearth furnace falls through ports located on the periphery of the "out-hearths" and through central ports on the "in-hearths".

Associated with each hearth or with alternate hearths or with special hearths, burners were provided by means of which the clay was heated and roasted by direct contact with the flame from the burner and by direct contact with the hot gas generated thereby. The direct impingement of the flame on the clay drove off the volatile compounds, such as hydrocarbons, and roasted the clay. The heat from the flame carbonized and burned out the coloring and contaminating substances which were contained in the pores of the clay. It has been found in connection with prior procedures that the clay has been subjected to temperatures which were so high as to cause calcining and sealing of the pores of the clay. In burners of the multiple hearth type, it has been possible to observe zones of heating where the open flame of the burner directly impinges on the clay. In these prior procedures any hydrocarbons, such as naphtha, mineral oil, gasoline, kerosene and the like, were ignited and burned at the surface of the clay. The burning of these hydrocarbons increased the surface temperature and tended to sinter the clay and to convert at least a part thereof to a sintered condition. It is well known that the filtering efficiency of such clay has been very small. Due to the draft pressure necessary to maintain combustion in ordinary multiple hearth furnaces (usually about 0.12 to 0.20 inch water pressure), slack losses as high as 20 to 30% of the clay were encountered and unfortunately, the lost material invariably includes more than its proportional part of the more active components of the absorbing material, (fines) with the result that the recovered material was of greatly reduced efficiency. After each revivifying cycle or passage through the multiple hearth furnace, the filtering efficiency of the clay was steadily and rapidly reduced and finally it was so low that the clay could not be used at a profit. Although many attempts were made to remedy the foregoing shortcomings, the proposals, as far as I am aware, only provided procedures wherein the clay could be used only a very few times before it had lost its absorbent and/or adsorbent properties and became practically valueless as a commercial decolorizing and purifying material.

I have discovered a procedure by means of which the shortcomings noted hereinabove can be avoided and by means of which spent decolorizing and/or purifying materials can be revivified efficiently without detrimentally affecting the decolorizing and purifying efficiency.

It is an object of the invention to provide a procedure involving the indirect heating of the spent decolorizing and/or purifying material and the isolation of the flame and heating gases from impinging directly upon, coming in contact with, contaminating the spent material under treatment and at the same time eliminating stack losses of fines, amounting up to about 20 to 30% of the clay.

It is another object of the invention to provide a process for indirectly heating and roasting spent material and to evaporate the volatile substances, such as oil, naphtha or the like, without detrimentally affecting such substances and without burning or contaminating them whereby the evaporated substance, such as oil, naphtha and the like can be recovered as valuable by-products.

It is a further object of the invention to provide a process of indirectly heating and treating material and to transfer heat to said material at a high efficiency.

It is also within the contemplation of the invention to provide an apparatus for carrying the present invention into practice which has one or more muffle chambers associated with the furnace to provide the heat necessary for heating, treating, and roasting material.

Moreover, the invention contemplates providing a furnace having at least one muffle chamber which is provided with a plurality of heat transfer tubes whereby the heat may be transferred from the hot flame without the flame and hot gases impinging and contacting with the spent decolorizing material under treatment.

It is still another object of the present invention to provide a plurality of oxidation chambers through which the heated material is passed after the volatilization of the distilled gases so that the carbonaceous particles may be oxidized out without causing sintering of the clay.

Other objects and advantages of the invention will become apparent from the following description taken in conjunction with the accompanying drawings, in which.

Figure 1:
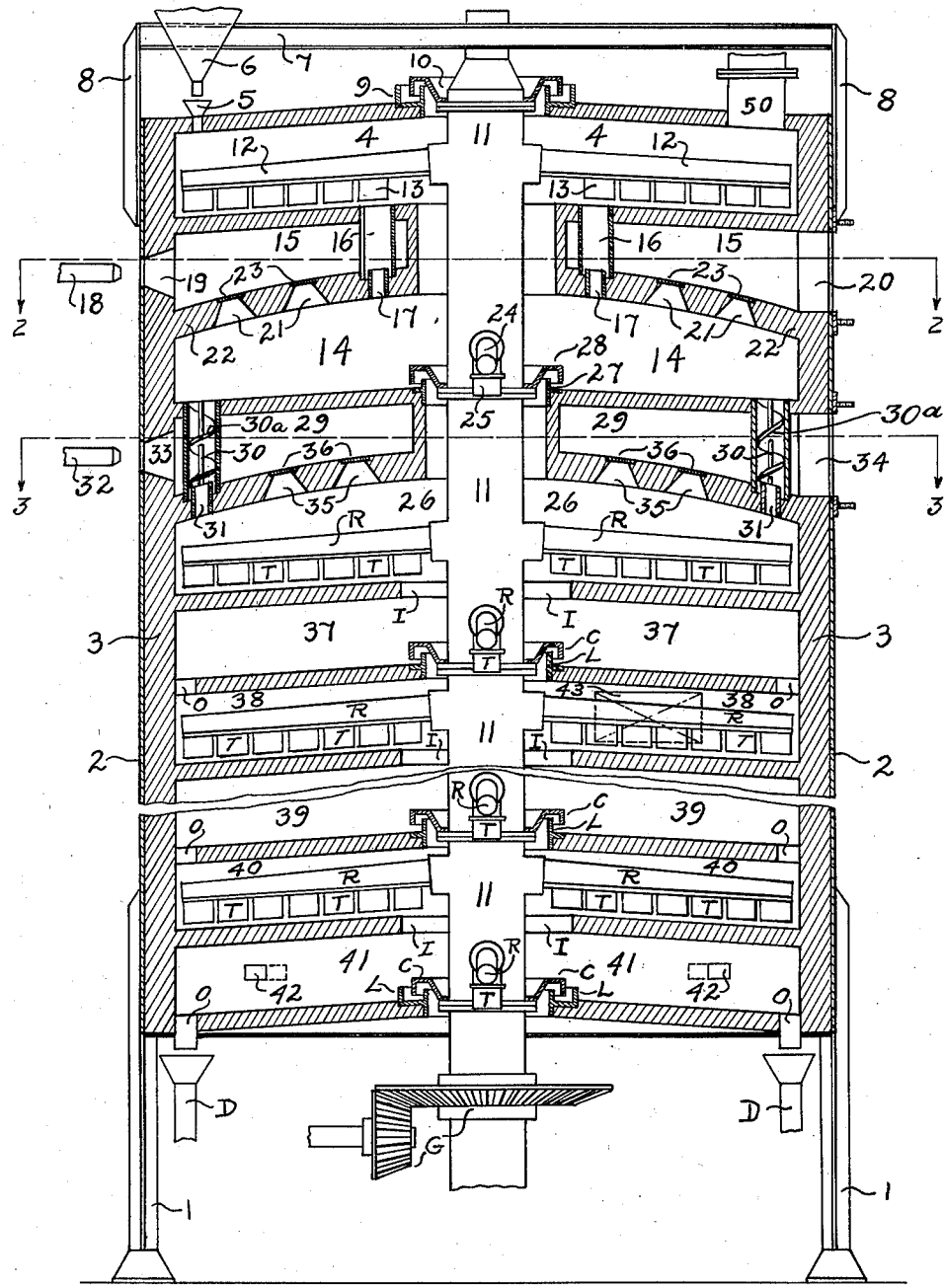
Fig. 1 is an elevational view, partly in section, of an apparatus embodying the present invention and capable of carrying the present procedure into practice.
Figure 2:
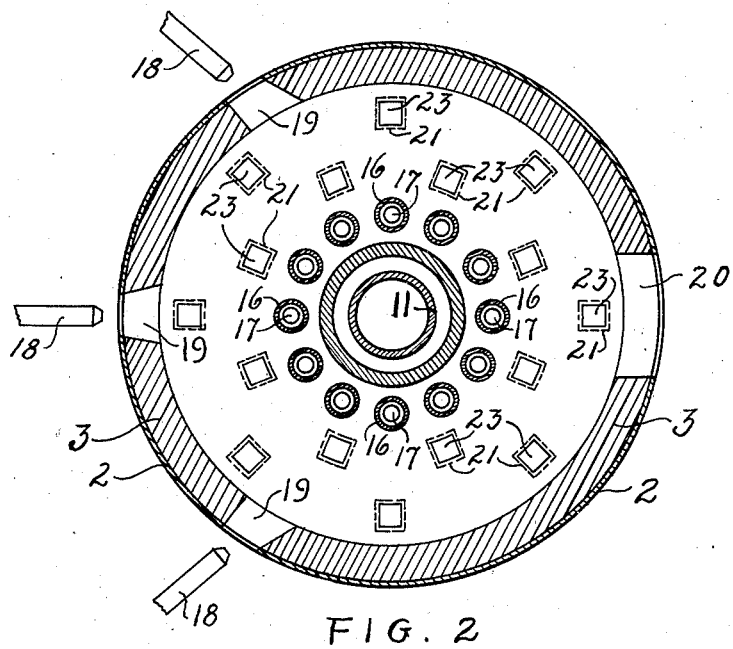
Fig. 2 is a sectional view taken on the line 2—2 of Fig. 1.
Figure 3:
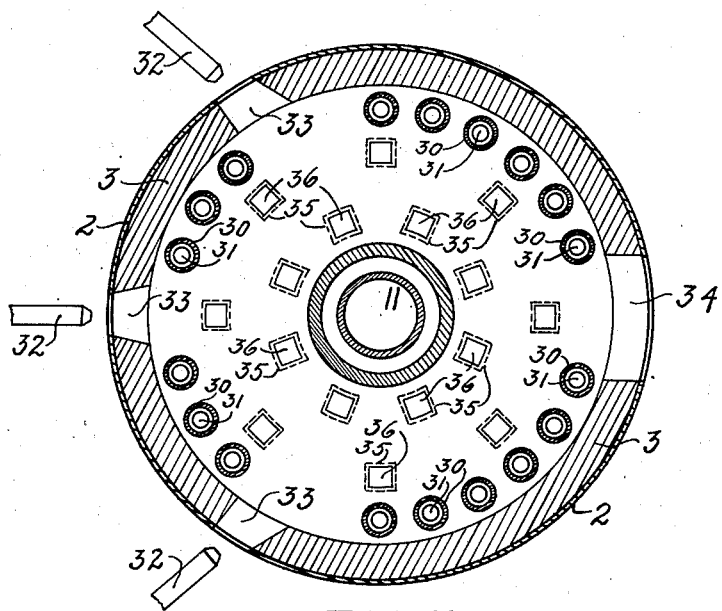
Fig. 3 is a sectional view taken on the line 3—3 of Fig. 1.

In Fig. 1 a multiple hearth furnace is illustrated which is mounted upon supports 1 which may be steel columns or the like. Seated on supports 1 is a steel shell 2 which is cylindrical in shape. Covering the interior of the steel shell is a lining 3, preferably of refractory material. Located within lining 3 are a plurality of superimposed hearths which are preferably made a part of the lining. Through the center of the furnace is a central shaft 11 on which are mounted a plurality of radial rabble arms projecting into and over the hearths for advancing the material therein.

The top hearth 4 is provided with an inlet 5 through which spent clay or other spent decolorizing and/or purifying material is introduced from a hopper or funnel 6. This hopper may be mounted in any suitable way. For instance, it may be supported by a cross member 7 which is secured to a plurality of uprights 8. The material is then advanced by the rabble arms 12 to the central drop tubes 16 through which it drops to the hearth 14. Hearth 14 likewise has rabble arms 24 which advance the material to the peripheral drop tubes 30 which conduct the material to hearth 26. By the aid of the rabble arms located on each successive hearth the material is then advanced alternately from the periphery of one hearth to the center of the next lower hearth where it passes through the ports (I) and (O). After treatment, the material finally leaves the furnace through outlet ports (O) and is dumped into hoppers D or the like.

For the purpose of sealing top hearth 4 at the shaft 11, a lute ring 9 and a cap 10 are provided.

It will be noted that the lute ring 9 is secured to the roof of the furnace whereas cap 10 is secured to the central vertical shaft 11. Projecting from shaft 11 in hearth 4 are a plurality of rabble arms 12 carrying a plurality of rabble teeth 13 which cause the clay to progress inwardly to drop tubes 16 which lead to hearth 14.

Interposed between top hearth 4 and next lower hearth 14 is a combustion chamber 15. Within this chamber and communicating with hearth 4 and hearth 14 are the drop tubes 16 and associated sleeves 17. It is preferred to incorporate drop tubes 16 and sleeves 17 in the combustion chamber when the chamber is being cast with refractory material. Associated with combustion chamber 15 is a burner 18 and a burner port 19. The flame and hot gases are completely isolated in the combustion chamber and the gases are carried away via outlet port 20 without coming into contact with the clay under treatment. The heat is transferred efficiently to the clay by means of drop tubes 16 which act as heat transfer tubes. To facilitate the transfer of heat to the clay I preferably provide a plurality of heat reflectors 21 in the roof 22 above hearth 14. It is preferred to employ discs 23 at the top of the reflectors which discs are preferably constituted of carborundum, chromite or similar refractory materials. By means of the heat reflectors 21, heat is radiated from the roof to the top surface of the clay or material under treatment which is upon hearth 14 without having to pass through a layer of baked clay on the floor of the hearth. A plurality of rabble arms 24 and rabble teeth 25 are provided to carry the clay or other material along hearth 14 so that the clay may drop to the next lower hearth 26. A lute ring 27 and associated cap 28 provide a seal at the central shaft and prevents the passage of material or gases.

It is preferred to provide another combustion chamber 29 between hearth 14 and hearth 26. Within combustion chamber 29, a plurality of drop tubes 30 are mounted near the periphery thereof. Spirals 30a may be provided in some or all of the drop tubes in order that the clay will flow slowly over an increased heating area. Associated with each drop tube is a sleeve 31. A burner 32 is mounted to operate in burner port 33 projecting inwardly and/or tangentially through the shell 2 and lining 3. The hot gases from the combustion chamber are withdrawn via gas outlet port 34. The combustion chamber is preferably provided with a plurality of heat reflectors 35 which have refractory discs 36 mounted at the top thereof which are adapted to convey and radiate the heat. It will be noticed that the heat is efficiently transferred and radiated from the muffle combustion chamber to the clay without the necessity of passing the heat through the floor of the hearth which has a thick bed of baked material thereon.

In this manner, the lighter oils and gases are volatilized and distilled off in a reducing or neutral atmosphere. All of the distilled gases are passed off in an unburned and uncontaminated condition through the flue 50 where they may be recovered and used either as by-products or used in the burners 18. The combustion products and the flames of the burners 18 are entirely segregated from the clay and thus have no opportunity of calcining or closing the pores of the clay. Although the flames and combustion products are muffled, the heat is permitted to be transferred directly through relatively thin and heat conducting walls.

Underneath hearth 26 are a plurality of superimposed oxidation hearths 37, 38, 39, 40 and 41. Associated with each hearth are a plurality of rabble arms R carrying a plurality of rabble teeth T. These rabble arms and teeth carry the material from one hearth to the other via inlet ports I and outlet ports O. At the bottom hearth 41 the outlet ports O are provided with discharging devices D which carry the revivified clay or the like to a conveyer or similar apparatus. Each out-hearth has a lute ring L and associated cap C to prevent the passage of clay, gas, etc. through the openings surrounding central shaft 11. In passing, it is to be observed that the central shaft is driven at the bottom by suitable means such as gears G.

When the heated and roasted material reaches hearth 37, the carbon contained therein is at a high temperature and is ready for ignition. When the material drops onto hearth 38, it comes into contact with oxygen which is supplied by air admitted through air inlet ports 42 which are preferably located on bottom hearth 41. The material as it passes from hearth 38 to 39 and then to hearths 40 and 41 has its carbon burned therefrom. After burning of the carbon the clay is cooled. The gases produced by the combustion are withdrawn by means of a large gas flue 43 which is associated with hearth 38. By providing a large gas flue, the velocity of the gases can be maintained at a relatively low figure and the tendency for gases to rise to the upper part of the furnace above hearth 37 is practically eliminated. By keeping down the velocity of the combustion gases as they pass out through the port 43, the fine clay particles 6 are not swept out by the draft. In this manner, the stack losses are kept at a minimum. By selecting the number of hearths below flue 43, it is possible to cool the treated clay or other material to any desired extent and thus to discharge the clay into discharging device D at any selected temperature. By adjusting air inlet ports 42 it is possible to regulate the amount of air admitted and thus to insure practically complete combustion of the carbon contained in the clay or other material and proper cooling.

The temperature in the top hearth is preferably maintained at approximately 800° F. The temperature of the drop tubes is preferably kept at approximately 950° to 1000° F. for new clays (second to fifth burns) and at approximately 1000° F. to 1050° F. for clays which have been reburned several times.

During the heating and roasting process the clay gives up a large amount of naphtha and oil vapor, etc. which does not come in contact with any open flame or with any heating or flue gas. The temperature around the drop tubes can be kept very uniform. As all of the clay has to pass through these tubes at about the same temperature and in small quantities due to the number of drop tubes, the treatment of the clay is very uniform. The oil and naphtha and other volatiles are completely distilled from the clay without combustion taking place and are removed via vapor outlet 50 to an appropriate recovery system for recovering oil, naphtha, etc. If desired thermostatic devices may be employed to maintain any selected temperature in the hearths, drop tubes, etc.

The absence of a flame directly impinging on the clay improves the revivifying of the clay and avoids the calcining, sintering or sealing of the porous clay. As no combustion takes place while the naphtha and oil and volatiles are distilled off, there is no sintering of the clay. The distilling process is completed and the volatilized gases removed before the material is subjected to oxidation.

The clay leaving the last series of drop tubes has a temperature of about 1000° F. and on the downward path thereof comes into contact with air which is introduced into the furnace to assist in the burning out of the heavier hydrocarbon and carbonaceous particles which were not distilled off. A gas flue is provided for carrying off these burnt gases to the atmosphere and to prevent contamination of naphtha, kerosene, oil, etc. which are evaporated in the upper hearths and which are withdrawn through volatile gas outlet 50. When the clay reaches the bottom hearth it is discharged from the furnace through one or more discharge devices onto conveyors or into bins for future use.

The drop tubes may be constructed of refractory material, cast iron or steel or alloys. Plain tubes or tubes containing spirals may be used in order that the clay will flow slowly over an increased heating area. These drop tubes may also be fitted with external fins of cast iron for additional heat absorption. These fins would add heat absorbing surface and being made of cast iron or the like would resist the corrosive action of the combustion gases and thus protect the steel or alloy drop tubes.

Although the present invention has been described in connection with the revivification of clay, it is to be understood that other materials may be treated and that a great variety of chemical and metallurgical procedures may be conducted in the improved furnace. As those skilled in the art will readily understand, modifications and variations may be resorted to without departing from the spirit and scope of the invention.

I claim:—

1. A furnace comprising a plurality of superimposed hearths, means for admitting material to be treated to the uppermost hearth, a plurality of combustion chambers interspaced between the upper hearths, a plurality of heat radiating discs forming the floor of the combustion chambers and the ceiling of the contiguous hearths, said discs adapted to radiate heat to the top surface of the material to be treated to volatilize substances therefrom, means for advancing material to be treated within the hearths, drop tubes connecting neighboring hearths passing through said combustion chambers and in intimate heat exchange therewith adapted to pass material to be treated from one hearth to the next lower hearth and to indirectly heat said material, means for withdrawing volatilized substances from said upper hearths, means for passing the material to be treated to lower selected hearths, means for admitting air to said lower hearths and means for withdrawing the combustion products from said lower hearths whereby the material to be treated and gases passing therefrom are not contaminated by the combustion products of said combustion chambers.

2. A furnace comprising a plurality of superimposed hearths, means for admitting material to be treated to the uppermost hearth, a plurality of combustion chambers interspaced between the upper hearths, a plurality of heat radiating discs forming the floor of the combustion chambers and the ceiling of the contiguous hearths, said discs adapted to radiate heat to the top surface of the material to be treated to volatilize substances therefrom, means for advancing material to be treated within the hearths, drop tubes passing through the said combustion chambers interconnecting the upper hearths through which the material passes said tubes being in intimate heat exchange with and being subjected to the radiating heat from the combustion chamber, means for withdrawing the volatilized substances from said upper hearths in an unburned and uncontaminated condition, means for passing the material to lower selected hearths, means for admitting air to said selected hearths, and a flue for withdrawing the combustion products from said selected hearths.

3. A furnace comprising a plurality of superimposed hearths, means for admitting material to be treated to the uppermost hearth, a plurality of combustion chambers interspaced between the upper hearths, a plurality of heat radiating discs forming the floor of the combustion chamber and the ceiling of the contiguous hearth, said discs adapted to radiate heat to the top surface of the material to be treated to volatilize substances therefrom, a central shaft passing through the hearths and means for rotating the same, rabble arms mounted thereon for advancing the material to be treated within the hearths, drop tubes passing through the said combustion chambers interconnecting the upper hearths through which the material passes said tubes being in intimate heat exchange with and being subjected to the radiating heat from the combustion chambers, means for withdrawing the volatilized substances from said upper hearths in an unburned and uncontaminated condition, means for passing the material to lower selected hearths, means for admitting a predetermined amount of air to said selected hearths for oxidizing the carbonaceous matter in the material, and a flue for withdrawing the combustion products of the said carbonaceous matter from said selected hearths.

4. A furnace comprising a plurality of superimposed hearths, means for admitting material to be treated to the uppermost hearth, at least one combustion chamber interspaced between the upper hearths, a plurality of heat radiating discs forming the floor of the combustion chamber and the ceiling of the contiguous hearth, said discs adapted to radiate heat to the top surface of the material to be treated to volatilize substances therefrom, a central shaft passing through the hearths and means for rotating the same, rabble arms mounted thereon for advancing the material to be treated within the hearths, drop tubes passing through the said combustion chamber interconnecting the upper hearths through which the material passes in intimate heat exchange with and subjected to the radiating heat from the combustion chamber, said combustion chamber having a lining of refractory material to provide heat insulation on the roof and the two side walls thereof and good heat transfer through the floor thereof whereby the heat produced in said combustion chamber is concentrated upon the drop tubes and upon said floors, means for withdrawing the volatilized substances from said upper hearths in an unburned and uncontaminated condition, means for passing the material to lower selected hearths, means for admitting a predetermined amount of air to said selected hearths for oxidizing the carbonaceous matter in the material, and a flue for withdrawing the combustion products of the said carbonaceous matter from said selected hearths.

5. A furnace comprising a plurality of superimposed hearths, means for admitting material to be treated to the uppermost hearth, at least one combustion chamber interspaced between the upper hearths, means for advancing material to be treated within the hearths, heat transfer drop tubes passing through the said combustion chamber interconnecting the upper hearths through which the material passes in intimate heat exchange with and being subjected to heat including radiated heat from the combustion chamber, said combustion chamber having a lining of refractory material to provide heat insulation on the roof and the two side walls and a floor having heat radiating discs incorporated therein whereby the heat produced in said combustion chamber is caused to indirectly heat said material through said heat transfer drop tubes and through said floor, means for withdrawing the volatilized substances from said upper hearths in an unburned and uncontaminated condition, means for passing the material to lower selected hearths, means for admitting air to said selected hearths, and a flue for withdrawing the combustion products from said selected hearths.

6. A furnace comprising a plurality of superimposed hearths, means for admitting material to be treated to the uppermost hearth, a plurality of combustion chambers interspaced between the upper hearths, a flue connected to said combustion chambers for discharging combustion gases therefrom, means for advancing material to be treated within the hearths, heat transfer drop tubes connecting neighboring hearths passing through said combustion chambers and in intimate heat exchange therewith adapted to pass material to be treated from one hearth to the next lower hearth and to indirectly heat said material, said combustion chambers having a lining of refractory material to provide heat insulation on the roof and the two side walls thereof and heat radiating discs incorporated in the floor thereof to provide good heat transfer therethrough whereby the heat produced in said combustion chambers is caused to indirectly heat said material through said drop tubes and through said floor, means for withdrawing volatilized substances from said upper hearths, means for passing the material to be treated to lower selected hearths, means for admitting air to said lower hearths, and means for withdrawing the combustion products from said lower hearths whereby the material to be treated and gases passing therefrom are not contaminated by the combustion products of said combustion chambers.

7. A furnace comprising a plurality of superimposed hearths, means for admitting material to be treated to the uppermost hearth, a combustion chamber interspaced between the lowest distillation hearth and the upper distillation hearths, heat radiating discs incorporated in the floor of said combustion chamber, a plurality of metallic drop tubes of high heat conductivity passing through said combustion chamber interconnecting the last two distillation hearths, said combustion chamber being heavily insulated with heat-resisting material on the roof and on the two side walls to cause indirect heating of said material through said drop tubes and through the floor of the combustion chamber, means for collectively heating the outer surface of said drop tubes to cause efficient and uniform indirect heating of the material floating in a fine stream through said tubes to volatilize the light hydrocarbons therefrom and at the same time heating the resulting vapors from such volatilization and produced on the last distillation hearth by the heat radiated from the floor of the combustion chamber to the top of the material to be processed, means for withdrawing the combustion gases from said combustion chamber, means for withdrawing the volatilized substances from said distillation hearths in an unburned and uncontaminated condition so that they can be recovered as valuable by-products, means for passing the material to lower selected hearths, means for admitting a predetermined amount of air to said selected hearths for oxidizing the carbonaceous matter in the material, and a flue for withdrawing the combustion products of the carbonaceous matter from said selected hearths.

8. A furnace comprising a plurality of superimposed hearths, means for admitting material to be treated to the uppermost hearth, a combustion chamber interspaced between the last lower distillation hearth and the upper distillation hearth, heat radiating discs incorporated in the floor of said combustion chamber, a plurality of thin-walled metallic drop tubes constituted of a metal having high heat conductivity passing through said combustion chamber and interconnecting the upper hearths, spirals in said drop tubes to cause slow flow of the material over an increased heating area, said combustion chamber being heavily insulated with heat-resisting material on the roof and the two side walls whereby the heat produced therein is caused to indirectly heat said material through said drop tubes, means for collectively heating the outer surface of said tubes to cause efficient and uniform indirect heating of the material as it flows in a fine stream through said tubes to volatilize the light hydrocarbons therefrom and to heat the resulting vapors, means for withdrawing the combustion gases from said combustion chamber, means for withdrawing the volatilized substances from said distillation hearths in an unburned and uncontaminated condition so that they can be recovered as valuable by-products, means for passing the material to lower selected hearths, means for admitting a predetermined amount of air to said selected hearths for oxidizing the carbonaceous matter in the material, and a flue for withdrawing the combustion products of the said carbonaceous matter from said selected hearths.

CARL G. KOEPPL.